United States Patent [19]

Yamamura

[11] Patent Number: 5,068,558
[45] Date of Patent: Nov. 26, 1991

[54] MAGNETIC BEARING DEVICE
[75] Inventor: Akira Yamamura, Tokyo, Japan
[73] Assignee: Nippon Ferrofluidics Corporation, Tokyo, Japan
[21] Appl. No.: 560,456
[22] Filed: Jul. 27, 1990

Related U.S. Application Data

[63] Continuation of Ser. No. 418,303, Oct. 6, 1989, abandoned.

[30] Foreign Application Priority Data

Oct. 7, 1988 [JP] Japan .................. 63-254620

[51] Int. Cl.$^5$ .............................................. H02K 7/09
[52] U.S. Cl. ................................................ 310/90.5
[58] Field of Search ............... 310/90.5; 324/207.16, 324/207.15

[56] References Cited

U.S. PATENT DOCUMENTS 3,890,019 6/1975 Boden ........................... 310/90.5
3,909,082 9/1975 Ishikawa ....................... 310/90.5
4,167,296 9/1979 Dendy .......................... 310/90.5
4,920,291 4/1990 McSparran .................... 310/90.5

FOREIGN PATENT DOCUMENTS 0311122 4/1989 European Pat. Off. ........... 310/90.5
2451972 5/1976 Fed. Rep. of Germany ..... 310/90.5

Primary Examiner—R. Skudy
Attorney, Agent, or Firm—Armstrong, Nikaido, Marmelstein, Kubovcik & Murray

[57] ABSTRACT

The invention discloses a magnetic bearing device having a rotary main shaft, an armature disk mounted on the rotary main shaft, and a pair of bearing elements disposed on opposite sides in axial direction of the armature disk of bearing elements includes a permanent magnet provided with a pair of pole pieces, the top ends of each of the pole pieces being disposed near to the armature disk, and a control coil being disposed between said pole pieces at a position nearer to front end side than the control coil.

1 Claim, 3 Drawing Sheets

MAGNETIC BEARING DEVICE

This application is a continuation of application Ser. No. 418,303 filed Oct. 6, 1989, abandoned.

BACKGROUND AND SUMMARY OF THE INVENTION

This invention relates to a magnetic bearing device.

An object the invention is to provide a magnetic bearing device of simple construction by which control characteristics with a control current improved, and an unbalanced spring constant due to displacement of armature disk is reduced.

BRIEF DESCRIPTION OF THE INVENTION

DESCRIPTION OF PREFERRED EMBODIMENT

With reference to the accompanying drawings, a preferred embodiment of the magnetic bearing device is hereinafter described.

Figure 1:
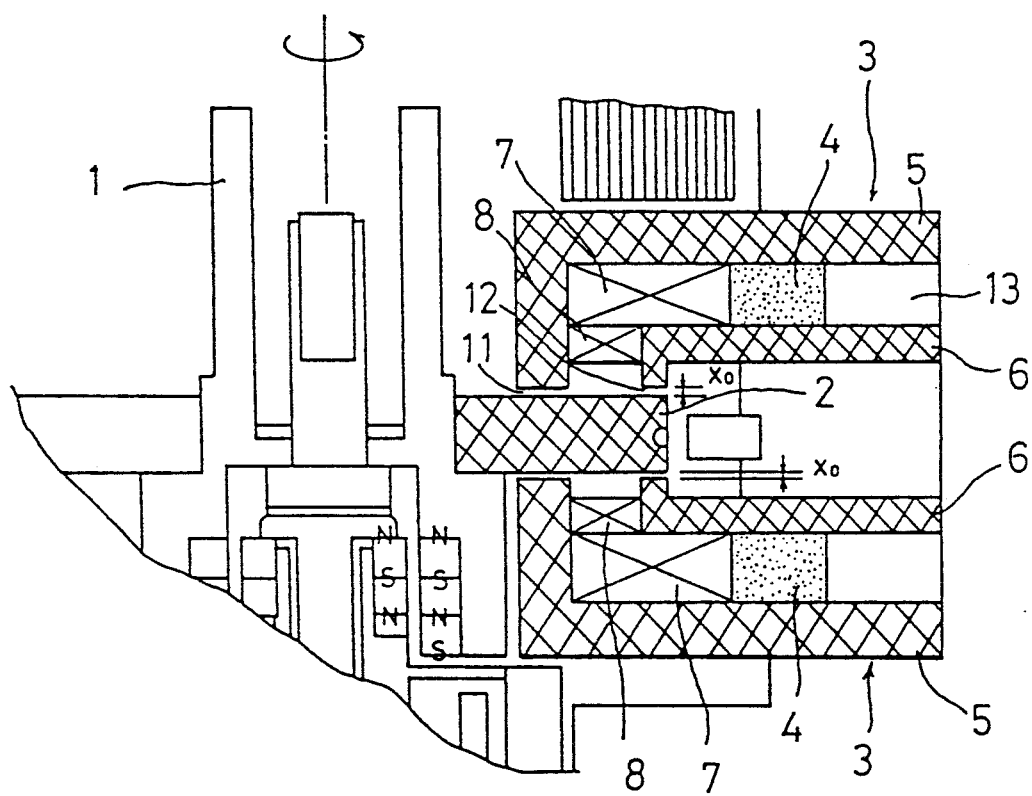
FIG. 1 is a longitudinal sectional view showing an embodiment of the magnetic bearing device according to this invention.

Referring to FIG. 1, numeral 1 indicates a main rotary shaft which is rotatably provided with an armature disk 2 thereby forming an integral unit. A pair of bearing elements 3, 3 are disposed on opposite sides i: the axial direction of the armature disk 2 putting the disk 2 therebetween. Each of the bearing elements 3, 3 comprises a pair of pole pieces 5, 6 mounted on two pole faces of a permanent magnet 4. Each of the pole piece: 5, 6 has a part extending in parallel with the armature disk 2 and a top end part further extending from the mentioned part to a position adjacent the armature disk. A control coil 7 is disposed on the bearing elements between the mentioned pair of pole pieces 5, 6 at a position near to the front end side of the bearing element than the permanent magnet 4. A sensor coil 8 is disposed at a position closer to the front end side than the mentioned control coil 7. The sensor coil 8 is wound in the same direction as the mentioned control coil 7.

Figure 2:
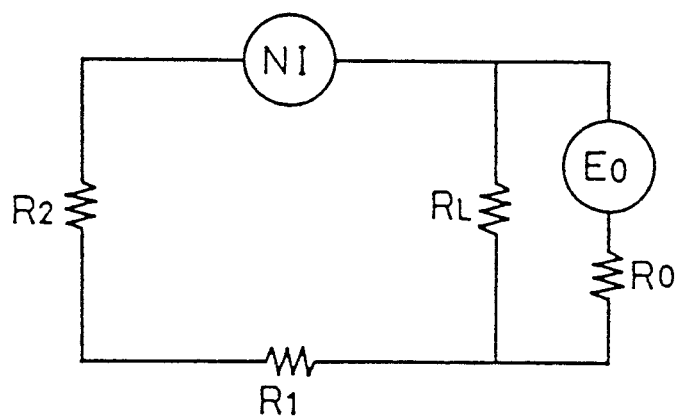
FIG. 2 is an equivalent circuit diagram of the above device.

In the magnetic bearing device of the above construction, first and second gaps 11, 12 are respectively formed on the tip end sides of the pole pieces 5, 6, and a leakage magnetic path 13 is formed on the base end sides of the pole pieces 5, 6, of which the equivalent circuit is shown in FIG. 2. In this circuit diagram, reference EO indicates the magnetomotive force of the permanent magnet 4, RO indicates internal magnetic resistance thereof, RL indicates magnetic resistance for leakage flux, R1 indicates magnetic resistance for the first gap 11, R2 indicates magnetic resistance for the second gap 12 and NI stands for the magnetic force of the control coil 7 where N is the number of turns in the control coil 7 and I is the control current.

In the construction described above, an unbalanced spring constant as a result of displacement of the armature disk 2 is in proportion to the following expression:

$$1/[1+RO/(1+RO/R1)(R1+R2).$$

Controlling force is in proportion to the following expression:

$$EO \cdot NI/R$$

$$R=(R1+R2)^2(1+RO/RL)+2RO(R1+R2)+RO^2/(1+R2/RL)$$

Accordingly, maximum value is obtained at the time of $$RL = RO(R1+R2)/[RO-(R1+R2)]$$
$$= RO/(a-1)$$

where: $RO = a(R1+R2)$, a being a constant

As mentioned above, the magnetic resistance of the magnetic path of the control coil 7 can be optimized by enlarging the gap between pole faces N and S of the permanent magnet 4, increasing the internal magnetic resistance RO (for instance, by forming the pole pieces 5, 6 of some soft magnetic substance) and forming a leakage path of the permanent magnet 1. Control characteristics with control current can be improved by disposing the control coil 7 on the side nearer to the front end than the permanent magnet 4. As a result of this, not only can unbalanced spring constants due to displacement of the armature disk be reduced, but also the entire construction can be simplified.

Figure 3:
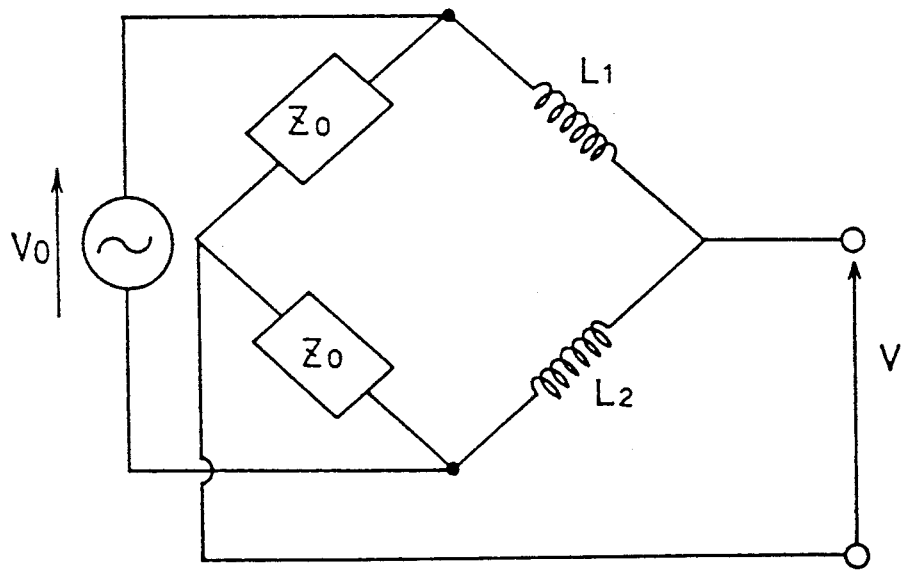
FIG. 3 is a schematic diagram showing the working principle of the displacement detecting sensor.

FIG. 3 is a schematic diagram showing the principle of displacement detection by a displacement detecting sensor. The displacement detecting sensor comprises the sensor coil 8 and the armature disk 2 (magnetic substance), and a high frequency current (about 50 KHz) is applied to the coil 8. When changing distance between the sensor coil 8 and the armature disk 2, inductance of the coil 8 varies in such a manner that the amplitude of the high frequency applied to the coil 8 is modulated. Such a modulated amount is detected by a detector as displacement. A detector circuit is formed into a bridge comprising two impedances Z0, Z0 and two sensor coils 11, L2 so that the displacement signal is outputted by a detection circuit, after differentially detecting the modulated amount.

Noise at the time of composing the control coil 7 and the sensor coil 8 together is not extremely high, despite that the strong magnetic field being generated in the control coil 7 of which the attractive force is increased, though the amount of inductance variation reaches a certain value. This is because the sensor coil 8 is distant from the armature disk 2. On the other hand, also in the control coil 7 of which the attractive force is decreased, the amount of inductance variation of the sensor coil 8 is almost the same as the mentioned certain value, despite the magnetic field generated being not so strong. This is because the distance between the sensor coil 8 and the armature disk 2 is shorter. In this manner, adoption of the differential detection system described above makes it possible to offset the amount of variation between each other, and there is no detection in the form of a displaced component, eventually resulting in accurate and precise detection of displacement.

Establishing that:

L1, L2: inductances of sensor coil,

Z0: reference impedance of the bridge,

: magnetic permeability of the gap,

S: sectional area of the magnetic core of the sensor coil, x0: distance to sensor target at balanced point, x: displacement from x0, w: angular frequency of voltage V0 applied to coil, and $N_s$: number of turns in the sensor coil output voltage V of the bridge is expressed as follows:

$$V = V0(jwL2 - jwL1)/2(jwL1 + JwL2)$$
$$= V0(L2 - L1)/2(L1 + L2).$$

Then, further establishing that:

$$L1 = \mu S N_s^2/2(x0 - x)$$
$$= a/(x0 - x), \text{ and}$$

$$L2 = \mu S N_s^2/2(x0 + x)$$
$$= a/(x0 + x),$$

a following expression is obtained:

$$V = -V0 \times /2 \times 0$$

Accordingly electric signal in proportion to the displacement can be obtained. Since V is a high frequency voltage of several 10 Khz of which the amplitude is in proportion to displacement, any displacement signal can be outputted by eliminating the high frequency component through detection.

As described above, in the axial displacement detection mechanism of this embodiment, since the sensor coil 8 has its magnetic path in common with the control coil 7, space can be saved. Furthermore, as a result of employing the differential detection mechanism as described above, the output of the sensor is zero when the armature disk 2 is in the center between the two bearing elements 3, 3. Thus, not only can irregularity among individual components be reduced but also a linear sensor output with respect to displacement can be obtained.

In the magnetic bearing device of above construction according to the invention, not only and the control characteristics with control current improved but also unbalanced spring constant due to displacement of the armature disk can be reduced. Furthermore, construction of the device can be simplified.

What is claimed is:

1. A magnetic bearing device comprising: a rotary main shaft; an armature disk mounted on said rotary main shaft; and a pair of bearing elements disposed on opposite sides of an axial direction of said armature disk, each of said bearing elements including a permanent magnet provided with a pair of pole pieces, a top end of each of the pole pieces being disposed near said armature disk, and a control coil being disposed between the pole pieces at a position nearer to a front end side of said bearing elements than the permanent magnet.

* * * * *